(12) United States Patent
Reynolds

(10) Patent No.: US 12,352,036 B2
(45) Date of Patent: *Jul. 8, 2025

(54) BUILDING SKIRTING BASE

(71) Applicant: DTR Investments, LLC, Cedaredge, CO (US)

(72) Inventor: David H. Reynolds, Cedaredge, CO (US)

(73) Assignee: DTR INVESTMENTS, LLC, Cedaredge, CO (US)

( * ) Notice: Subject to any disclaimer, the term of this patent is extended or adjusted under 35 U.S.C. 154(b) by 172 days.

This patent is subject to a terminal disclaimer.

(21) Appl. No.: 17/903,987

(22) Filed: Sep. 6, 2022

(65) Prior Publication Data

US 2023/0058769 A1  Feb. 23, 2023

Related U.S. Application Data

(63) Continuation-in-part of application No. 17/350,713, filed on Jun. 17, 2021, now Pat. No. 12,044,001, which is a continuation of application No. 16/192,222, filed on Nov. 15, 2018, now Pat. No. 11,047,127.

(51) Int. Cl.
| | |
|---|---|
| *E04B 1/00* | (2006.01) |
| *E04B 1/343* | (2006.01) |
| *E04F 13/08* | (2006.01) |
| *B60P 3/32* | (2006.01) |

(52) U.S. Cl.
CPC ...... *E04B 1/34342* (2013.01); *E04B 1/34347* (2013.01); *E04B 1/34352* (2013.01); *E04F 13/0803* (2013.01); *B60P 3/32* (2013.01)

(58) Field of Classification Search
CPC ............. E04B 1/34352; E04B 1/34342; E04B 1/34347; E04B 1/6154; E04F 13/0803; E04F 13/0801; E04F 13/0821; E04F 13/0823; Y10S 52/03; B60P 3/32
USPC .............. 52/169.12, DIG. 3, 800.15, 800.18, 52/800.17, 800.12
See application file for complete search history.

(56) References Cited

U.S. PATENT DOCUMENTS

| | | | |
|---|---|---|---|
| 1,803,589 A | | 5/1931 | Bohnsack |
| 3,865,358 A | | 2/1975 | Butters |
| 4,242,848 A | | 1/1981 | Schoultz |
| 4,663,883 A | * | 5/1987 | Hilliard .................... A01G 9/28 |
| | | | 47/33 |
| 5,644,878 A | | 7/1997 | Wehrmann |
| (Continued) | | | |

OTHER PUBLICATIONS

Official Action for U.S. Appl. No. 16/192,222, dated Aug. 26, 2019, 11 pages.

(Continued)

*Primary Examiner* — Chi Q Nguyen
(74) *Attorney, Agent, or Firm* — Sheridan Ross PC

(57) ABSTRACT

A mobile home skirting base comprising: a horizontal surface; and two vertical members co-extruded with the horizontal surface forming a channel to insert a mobile home skirting panel wherein a height of one of the vertical members is greater than a height of another one of the vertical members. One of the vertical members also comprises a hook-shaped retention edge. The mobile home skirting base allows the mobile home skirting base to provide strong support, stabilization, and protection of the skirting panels.

15 Claims, 16 Drawing Sheets

(56) References Cited

U.S. PATENT DOCUMENTS

| | | | |
|---|---|---|---|
| 5,907,933 A | 6/1999 | Stanfill | |
| 6,076,327 A | 6/2000 | Hendrickson | |
| 6,322,045 B1 * | 11/2001 | Andros | E04G 17/14 |
| | | | 249/188 |
| 6,374,552 B1 | 4/2002 | Price | |
| 6,543,197 B2 | 4/2003 | Wetzel, III et al. | |
| 6,588,165 B1 | 7/2003 | Wright | |
| 7,207,147 B2 | 4/2007 | Price et al. | |
| 7,685,781 B1 * | 3/2010 | Hatch | E04B 1/34342 |
| | | | 52/800.12 |
| 8,646,237 B1 | 2/2014 | Takagi | |
| 8,739,483 B1 | 6/2014 | Bilge | |
| 9,181,713 B1 | 11/2015 | Farahmandpour | |
| 9,540,804 B1 | 1/2017 | Farahmandpour | |
| 10,208,484 B1 | 2/2019 | Simonsen | |
| 10,407,917 B1 | 9/2019 | Bilge | |
| 10,787,817 B1 * | 9/2020 | Bilge | E04F 13/12 |
| 11,047,127 B2 | 6/2021 | Reynolds | |
| 2007/0068101 A1 | 3/2007 | Weir et al. | |
| 2007/0163187 A1 | 7/2007 | Price | |
| 2007/0163203 A1 | 7/2007 | Price | |
| 2007/0175114 A1 | 8/2007 | Price | |
| 2008/0216444 A1 * | 9/2008 | Loyd | E04F 13/0826 |
| | | | 52/742.16 |
| 2011/0072744 A1 * | 3/2011 | Maley | E04F 19/066 |
| | | | 52/220.1 |
| 2014/0112698 A1 | 4/2014 | Ben David | |
| 2014/0202113 A1 * | 7/2014 | Bilge | E04F 13/0866 |
| | | | 403/300 |
| 2016/0369496 A1 | 12/2016 | Farahmandpour | |
| 2021/0310236 A1 | 6/2021 | Reynolds | |

OTHER PUBLICATIONS

Official Action for U.S. Appl. No. 16/192,222, dated Apr. 30, 2020, 11 pages.

Official Action for U.S. Appl. No. 16/192,222, dated Nov. 10, 2020, 9 pages.

Notice of Allowance for U.S. Appl. No. 16/192,222, dated Mar. 3, 2021, 8 pages.

Official Action for U.S. Appl. No. 17/350,713, dated Sep. 9, 2022, 11 pages.

Official Action for U.S. Appl. No. 17/350,713, dated Jun. 22, 2023, 11 pages.

Official Action for U.S. Appl. No. 17/350,713, dated Dec. 12, 2023, 5 pages.

Official Action for U.S. Appl. No. 17/350,713, dated Mar. 7, 2023, 11 pages.

* cited by examiner

BUILDING SKIRTING BASE

CROSS REFERENCE TO RELATED APPLICATION

This application is a continuation-in-part of U.S. patent application Ser. No. 17/350,713, titled "BUILDING SKIRTING BASE" and filed on Jun. 17, 2021, which is a continuation application of U.S. patent application Ser. No. 16/192,222, titled "BUILDING SKIRTING BASE" and filed on Nov. 15, 2018 (now U.S. Pat. No. 11,047,127, issued Jun. 29, 2021), each of which applications are incorporated herein by reference in their entireties.

FIELD OF INVENTION

The present disclosure relates generally to building skirting and more specifically to mobile building skirting bases.

BACKGROUND

Elevated buildings such as, for example, mobile homes, mobile buildings, or mobile offices (collectively referred to herein as "mobile homes") are often set on a base that is elevated above the ground. This elevated configuration lends to a less than pleasing aesthetic result given that the mobile home is often mounted on blocks leaving the under-framing, undercarriage, and/or one or more wheel axels exposed.

Conventionally, a series of vertical and/or horizontal panels, commonly known as skirting, can be used to cover the under-side of the mobile home and create a more aesthetically pleasing appearance. Skirting can take many forms and can be manufactured from many materials such as. for example, vinyl, wood, metal, polymer, or some combination thereof. Most often there is both a vertical and a horizontal component to skirting and a need to maintain the position of the skirting while having accessibility to the under-side of the mobile home.

To maintain the position of the skirting under the mobile home, often the vertical components, to which the horizontal components are attached, can be inserted into a base member attached at both the top of the skirting and the bottom of the skirting, wherein the vertical member is further secured by dips or screws to maintain structural integrity.

SUMMARY

In accordance with the teachings disclosed herein, embodiments related to a mobile home skirting base are disclosed.

A mobile home skirting system according to at least one embodiment of the present disclosure comprises: a horizontal surface; a first vertical member affixed to the horizontal surface along a first edge of the first vertical member; a second vertical member affixed to the horizontal surface along a first edge of the second vertical member opposite the first vertical member thereby defining a channel between the first and second vertical members, wherein the horizontal surface extends outward from both sides of the channel to provide sufficient material for connection to a substrate and wherein the horizontal surface, the first vertical member and the second vertical member define a base; and a first hook-shaped retention edge on a second edge of the first vertical member inwardly oriented toward the channel, wherein a height of the first vertical member is less than a height of the second vertical member and wherein the hooked shaped retention edge and the second vertical member are biased towards the channel and configured to secure a vertical skirting panel through direct physical pressure exerted by the first and second vertical members.

Any of the aspects herein, wherein the mobile home skirting base comprises a single extruded polymer.

Any of the aspects herein, wherein the system comprises extruded material.

Any of the aspects herein, wherein the system is attached to a substrate by one of mechanical attachment or chemical attachment Any of the aspects herein, wherein the mechanical attachment is selected from the group consisting of: nails; screws; bolts; staples; and anchors.

Any of the aspects herein, wherein the chemical attachment is selected from the group consisting of: glue, cement, and epoxy.

Any of the aspects herein, wherein the base supports both a bottom and a top of the skirting system.

Any of the aspects herein, wherein the height of the first vertical member is between 3-5 inches.

Any of the aspects herein, wherein the height of the second vertical member is between 4-6 inches.

A mobile home skirting system according to at least one embodiment of the present disclosure comprises: a horizontal surface; a first vertical member affixed to the horizontal surface along a first edge of the first vertical member; a second vertical member affixed to the horizontal surface along a first edge of the second vertical member opposite the first vertical member thereby defining a channel between the first and second vertical members, wherein the horizontal surface extends outward from both sides of the channel to provide sufficient material for connection to a substrate and wherein the horizontal surface, the first vertical member and the second vertical member define a base; and a first hook-shaped retention edge on a second edge of the first vertical member inwardly oriented toward the channel, wherein a height of the first vertical member is less than a height of the second vertical member and wherein the hooked shaped retention edge and the second vertical member are biased towards the channel and configured to secure a vertical skirting panel through direct physical pressure exerted by the first and second vertical members, wherein the mobile home skirting base comprises a single extruded polymer.

Any of the aspects herein, wherein the system comprises extruded material.

Any of the aspects herein, wherein the system is attached to a substrate by one of mechanical attachment or chemical attachment Any of the aspects herein, wherein the mechanical attachment is selected from the group consisting of: nails; screws; bolts; staples; and anchors.

Any of the aspects herein, wherein the chemical attachment is selected from the group consisting of: glue, cement, and epoxy.

Any of the aspects herein, wherein the base supports both a bottom and a top of the skirting system.

Any of the aspects herein, wherein the height of the first vertical member is between 3-5 inches.

Any of the aspects herein, wherein the height of the second vertical member is between 4-6 inches.

A mobile home skirting system according to at least one embodiment of the present disclosure comprises: a base comprising a first horizontal surface adapted to be attached to a substrate on which a mobile home rests, the base including a first vertical member and a second vertical member, wherein a channel is defined between the first vertical member and second vertical member, a height of the first vertical member is less than a height of the second vertical member, the first vertical member having an inwardly oriented hook-shaped retention edge forming an acute angle toward the channel and the second vertical member being biased toward the channel, thereby the first vertical member and the second vertical member form a biasing force towards the channel to retain a vertical skirting panel; the first vertical member having a height that is substantially similar to horizontal members of the mobile home skirting system, wherein the first and second vertical members are adapted to secure a vertical skirting panel through direct physical pressure exerted by the first and second vertical members.

Any of the aspects herein, wherein the horizontal surface of the skirt base comprises a first lip adjacent the first vertical member and a second lip adjacent the second vertical member, each extending outward from the channel.

Any of the aspects herein, wherein a length of the first lip and a length of the second lip are no less than 20% of the height of at least one of the first vertical member or the second vertical member.

In an embodiment, the base comprises a first horizontal surface that can be attached to a substrate on which a mobile home Is mounted at the end of said base's horizontal edge for additional structural stability. The base also comprises two substantially equal, substantially symmetrical vertical surfaces co-extruded with the horizontal surface, wherein each vertical surface has an inwardly oriented hook-shaped retention edge to provide a substantially rigid friction surface to retain vertical skirting supports and panels.

The base serves to hold vertical mobile home skirting panels in place, stabilize the panels from being displaced either laterally or vertically by natural elements including wind, and to protect the aesthetic quality of the vertical skirting panels by preventing said panels from getting scratched by natural elements or artificial elements including landscaping equipment.

As compared to other mobile home skirting bases in the prior art, the vertical surfaces co-extruded with the horizontal surface in this invention provide greater support, stabilization, and protection of the vertical skirting panels due primarily to three aspects of the mobile home skirting base that work in concert with each other to provide distinct and novel utility described in this invention. The first principal aspect of the invention is the substantially equal and substantially symmetrical nature of the base's vertical surfaces. The second principal aspect is the inwardly oriented hook-shaped retention edge of each vertical surface arising from the horizontal surface of the base. The third principal aspect is the vertical surfaces' relatively substantial height which each exceed the length of the horizontal surface of the base in one embodiment, and in another embodiment, and each vertical surface of the base exceeds half the length of the horizontal surface of the base.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, and C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
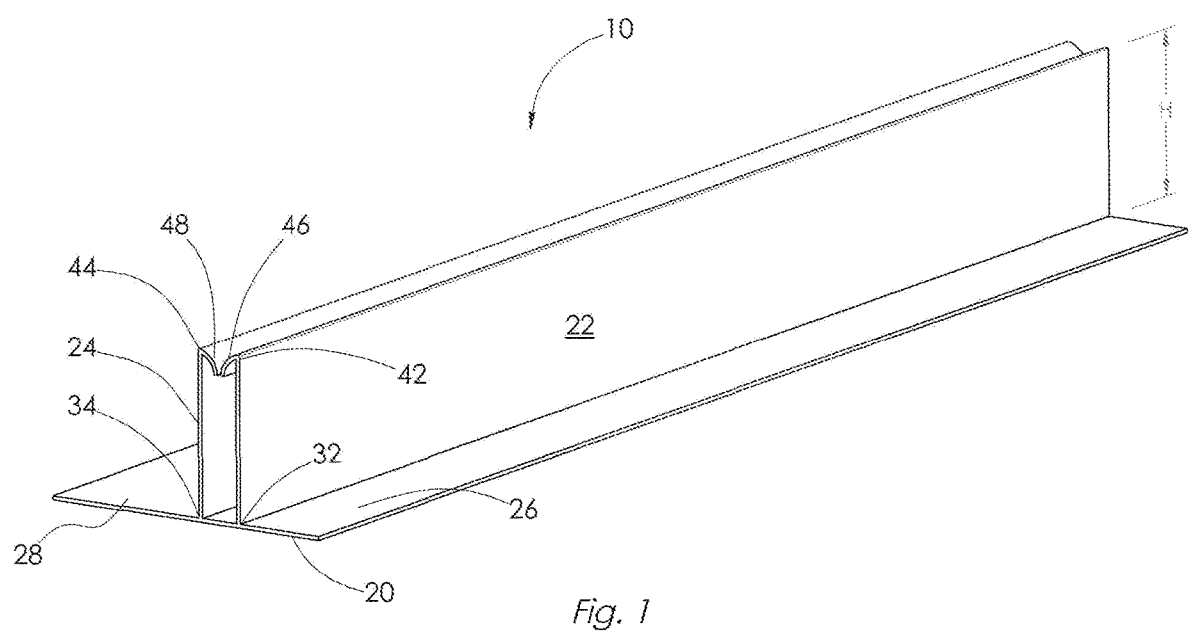
FIG. 1 is a perspective view of the mobile home skirting base according to aspects of the present invention.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The use of "substantially" in the present disclosure, when referring to a measurable quantity (e.g., a diameter or other distance) and used for purposes of comparison, is intended to mean within 5% of the comparative quantity. The terms "substantially similar to," "substantially the same as," and "substantially equal to," as used herein, should be interpreted as if explicitly reciting and encompassing the special case in which the items of comparison are "similar to," "the same as" and "equal to," respectively.

A detailed description of the embodiments for a mobile home skirting base device will now be presented with reference to FIGS. 1 through 12e. One of skill in the art will recognize that these embodiments are not intended to be limitations on the scope, and that modifications are possible without departing from the spirit thereof. In certain instances, well-known methods, procedures, components, and circuits have not been described in detail.

Referring now to FIGS. 1-6b, at least one embodiment of a skirting base 10 is shown. The skirting base 10 comprises a horizontal surface 20 and a first vertical member 22 affixed to the horizontal surface 20 at a first end 32 of the first vertical member 22. The skirting base 10 further comprises a second vertical member 24 affixed to said horizontal surface 20 at a first end 34 of the second vertical member 22 opposite the first vertical member 22 thereby defining a channel 30 between the first vertical member 22 and second vertical member 24.

According to aspects of the present invention, the height of the first vertical member 22 and the second vertical member 24 are substantially similar. In addition, the dimension of the height (H) of the first vertical member 22 and the second vertical member 24 is substantially similar to the horizontal members of the mobile home skirting 50, 52 (shown in FIG. 3) to provide a more uniform appearance of the skirting in general.

Figure 2:
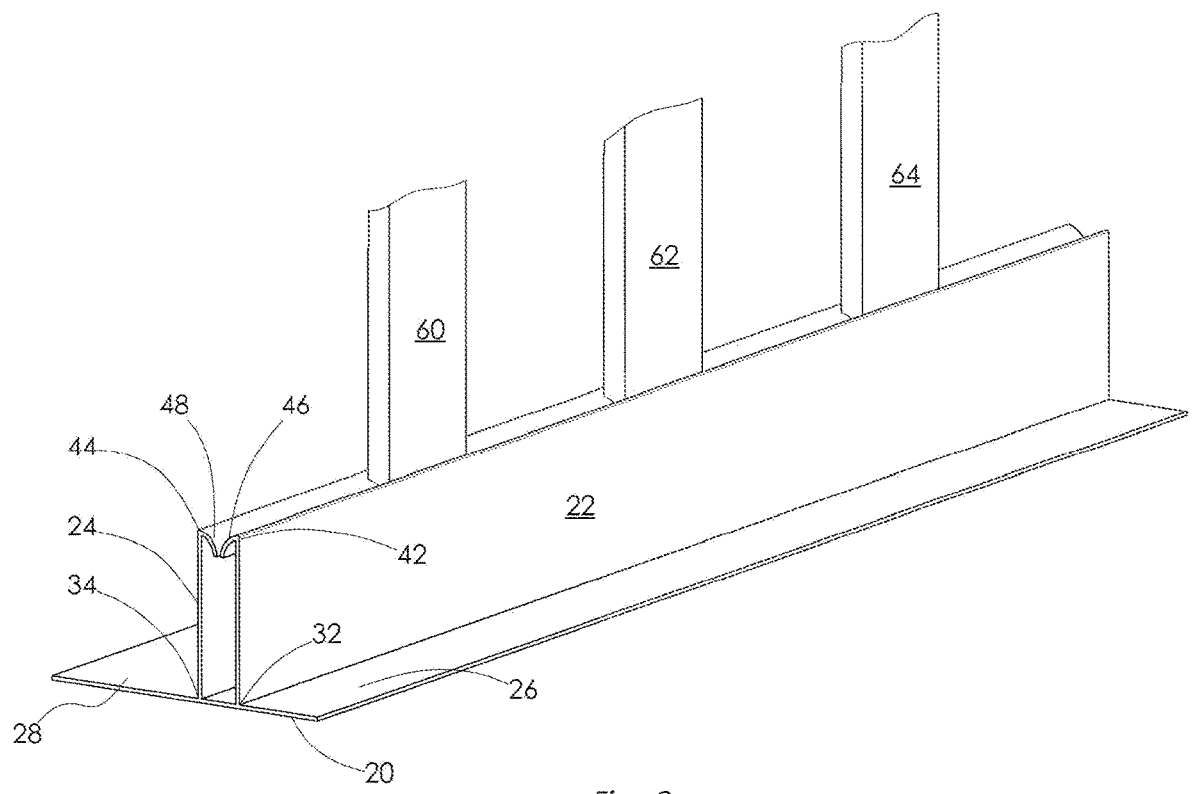
FIG. 2 is a perspective view of the mobile home skirting base including vertical supports according to aspects of the present invention.
Figure 3:
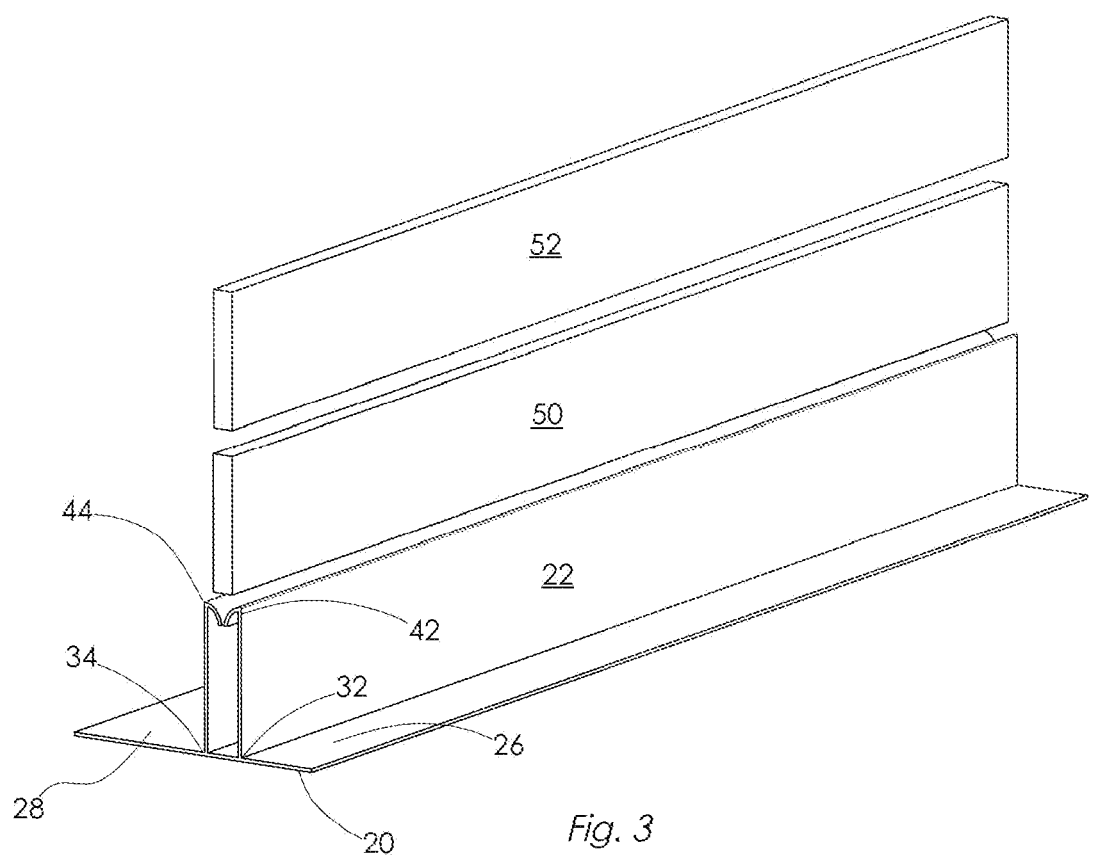
FIG. 3 Is a perspective view of the mobile home skirting base including horizontal members according to aspects of the present invention.
Figure 4:
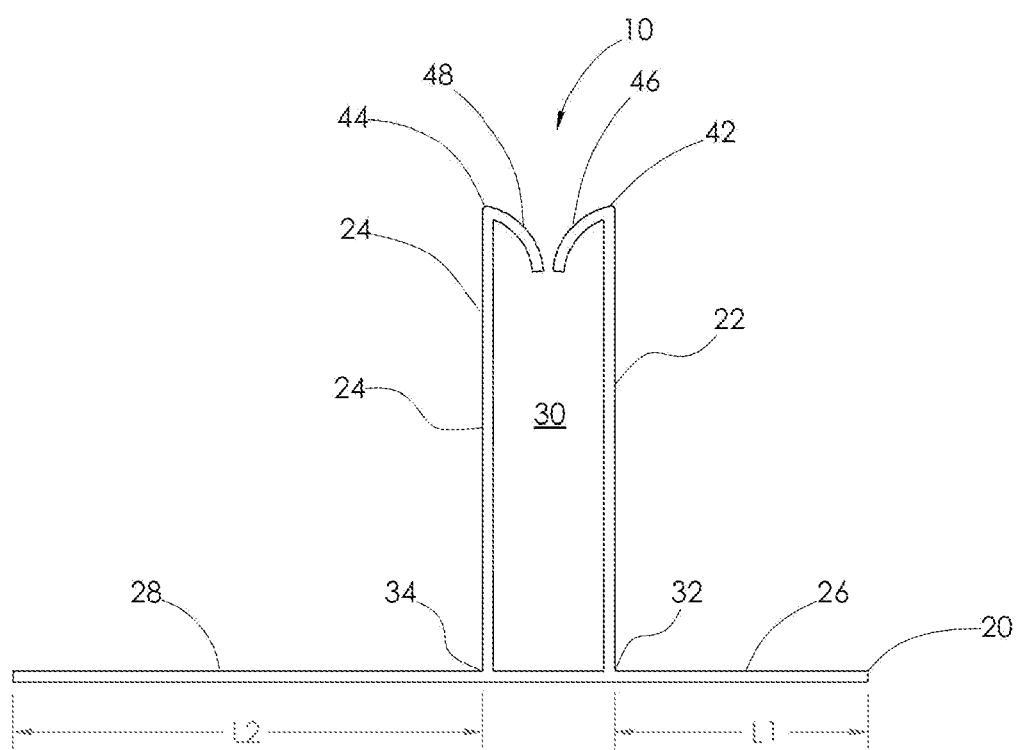
FIG. 4 is a cross-cut view of the mobile home skirting base according to aspects of the present invention.
Figure 5:
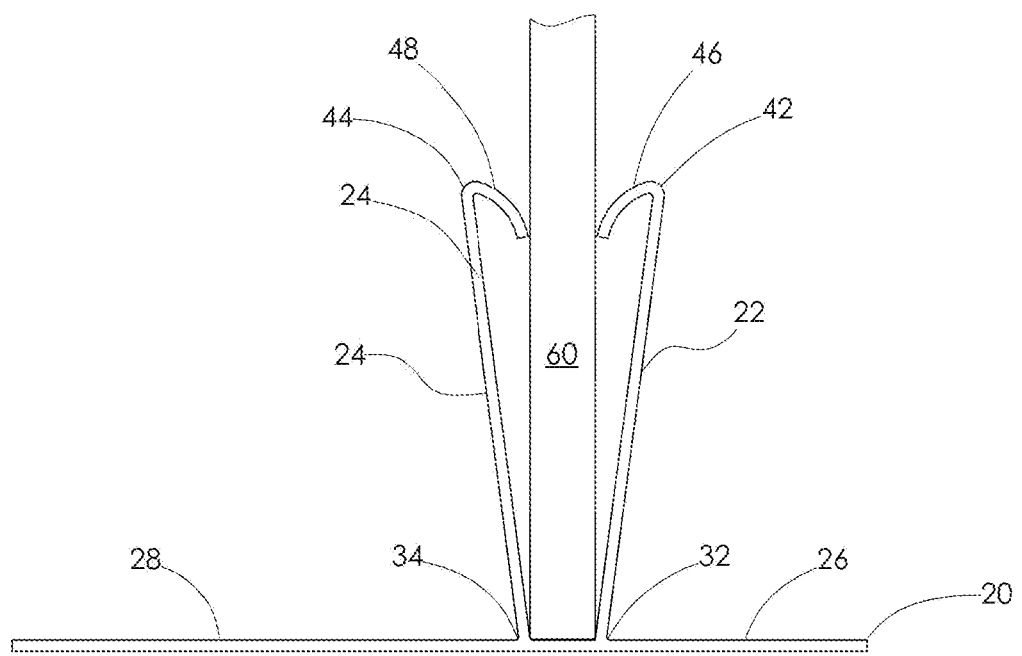
FIG. 5 is a cross-cut view of the mobile home skirting base including a vertical support according to aspects of the present invention.

On a second end 42 of the first vertical member 22, a hook-shaped retention edge 46 is inwardly oriented toward the channel 30 at an acute angle to provide a substantially rigid friction surface to retain vertical skirting supports and panels 60, 62, 64 (shown in FIG. 2).

On a second end 44 of the second vertical member 24, a hook-shaped retention edge 48 is inwardly oriented toward the channel 30 at an acute angle to provide a substantially rigid friction surface to retain vertical skirting supports and panels 60, 62, 64 (shown in FIG. 2).

The hook-shaped retention edges 46, 48 of the vertical members 22, 24 secure vertical skirting supports 60, 62, 64 (shown in FIG. 2) through direct physical pressure and friction rather than by mechanical means, such as for example, a screw. Although, mechanical means may be utilized to provide additional structural integrity.

The skirting base 10 provides strong support, stabilization, and protection of the vertical skirting supports 60, 62, 64 (shown in FIG. 2) because the retention edges 46, 48 are hook shaped, inward facing, and in close proximity to one other. Moreover, substantially similar height of the vertical members 22, 24 provide additional friction by the resistance that each retention edge 46, 48 places in the direction of the other retention edge 48, 46.

The height (H) of the first vertical member 22 and second vertical member 24 differs from prior art skirt bases inasmuch as prior art skirt bases have opposing vertical members that are not the substantially similar in size, do not have inward facing retention edges, and are not substantially similar in size to the height of the horizontal skirting members 50, 52.

The horizontal surface 20 of the skirt base 10 can comprise a first lip 26 adjacent the first vertical member 22 and a second lip 28 adjacent the second vertical member 24, each extending outward from the channel to provide sufficient material to enhance the stability of the skirt base 10 or to allow for physical connection of the to a substrate. The length (L1) of the first lip 26 and the length (L2) of the second lip 28, can vary depending on the particular need or application.

As contemplated herein, the length (L1) of the first lip 26 and the length (L2) of the second lip 28 are no less than 20% of the height (H) of the vertical members 22, 24. This results in base 10 having a first lip 26 and a second lip 28 approximately 3 or 4 times larger than existing solutions, The result is additional stability due to the increased contact with the substrate.

An additional benefit from the increase in the size of the first lip 26 and a second lip 28, is that the longer lip surfaces assist in preventing vegetation, such as grass, weeds, or plants from growing immediately adjacent the vertical surface of the skirting assembly and allows lawn maintenance implements, such as lawn mowers, edgers, weed eaters, and the like to be used near the skirting assembly without having to be too close to the skirting assembly and possibly causing accidental damage.

The increased and substantially similar height of the vertical members 22, 24 of the skirting base 10 not only provide a better bite by way of the inward facing retention edges, but allow for maintenance in and around the skirting, such as, for example, weed-eating and other landscaping activities that may otherwise cause displacement of a vertical skirting support upon contact due to lowered or asymmetrical vertical member heights.

In alternate embodiments, the mobile home skirting base can be alternatively configured for differing needs. By way of example, the length (L1) of the first lip 26 and the length (L2) of the second lip 28 can be identical or the length (L1) of the first lip 26 can be greater than the length (L2) of the second lip 28.

In additional embodiments, the skirting base 10 and skirting assembly can be configured to operate as an aesthetic repair for previously installed and damaged skirting.

Figure 6A:
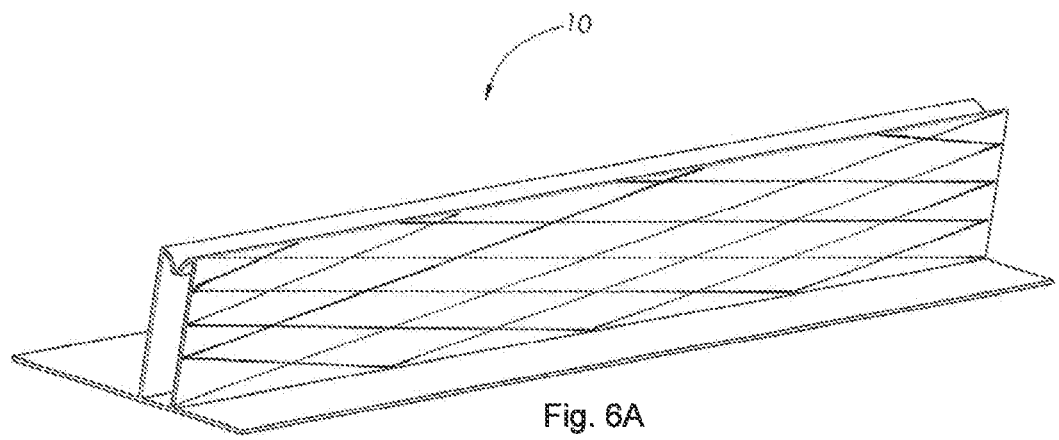
FIG. 6a is a view of the mobile home skirting base according to aspects of the present invention showing a pattern embossed on the surface of a vertical member.
Figure 6B:
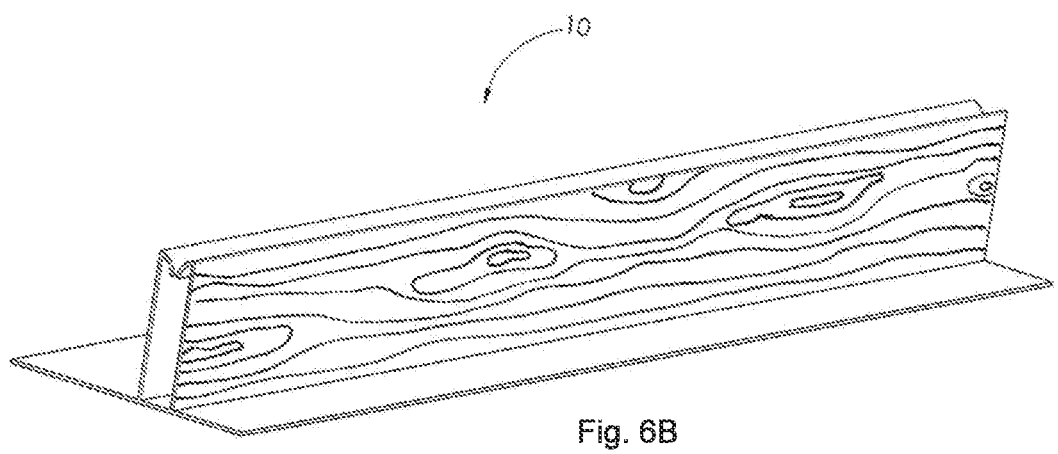
FIG. 6b is a view of the mobile home skirting base according to aspects of the present invention showing a natural wood pattern embossed on the surface of a vertical member.
Figure 7:
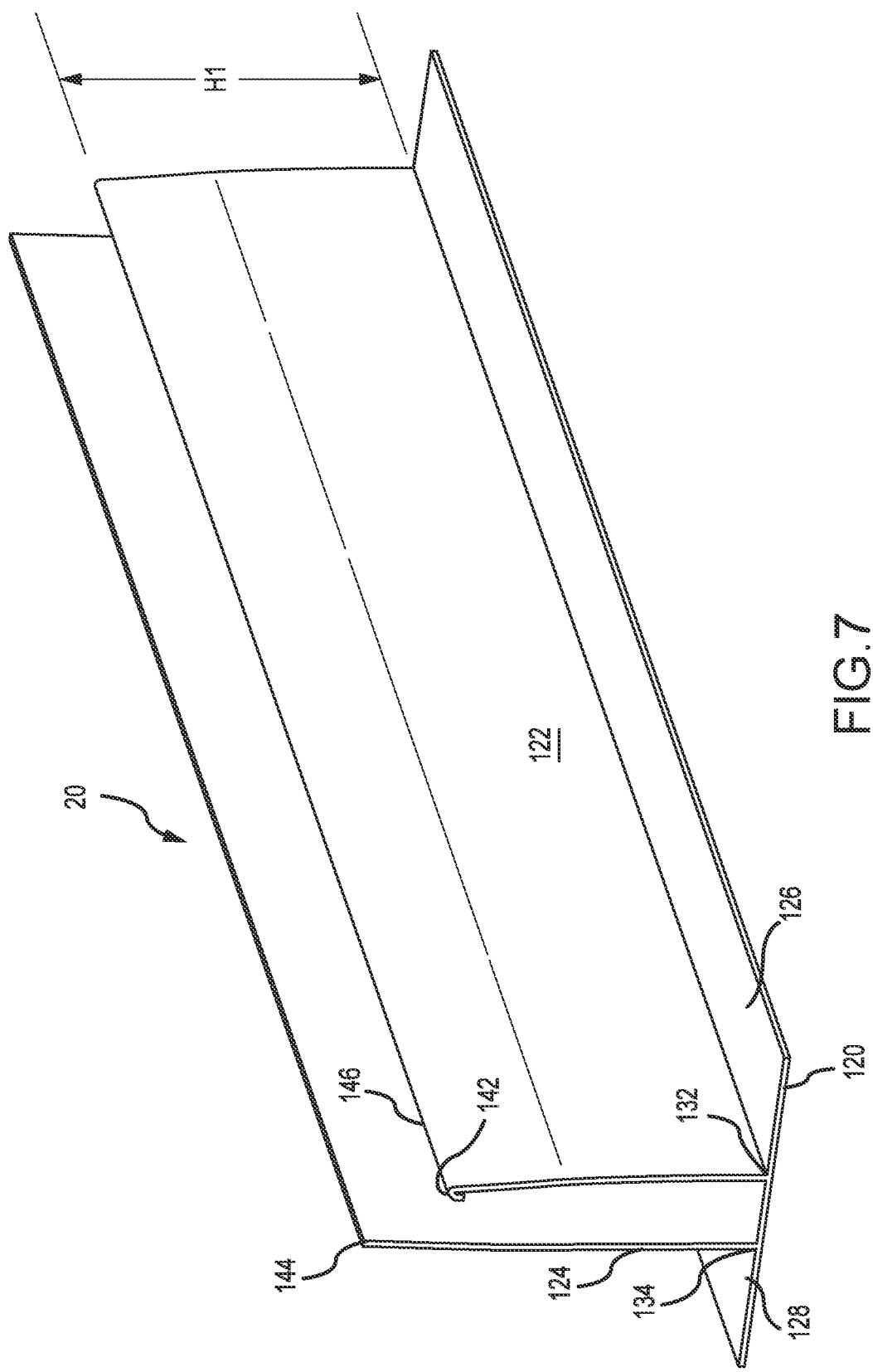
FIG. 7 is a perspective view of a mobile home skirting base according to aspects of the present invention.

As shown in FIGS. 6a and 6b, the skirting base 10 can be manufactured from vinyl wood, metal, fiberglass, polymer, or any combination thereof. The skirting base 10 can be molded, folded, milled, welded, extruded or any combination thereof. In addition, one or more of the vertical members 22, 24 of the skirting base 10 can be embossed with a design or pattern, such as, for example, a pattern that emulates natural wood. According to aspects of the present invention, extrusion of polymer material is the preferred method of manufacture.

Turning to FIGS. 7-11, a skirting base 20 according to at least one embodiment of the present disclosure is shown and described. The skirting base 20 is similar to the skirting base 10 and comprises a horizontal surface 120 and a first vertical member 122 affixed to the horizontal surface 120 at a first end 132 of the first vertical member 122. The skirting base 20 further comprises a second vertical member 124 affixed to said horizontal surface 120 at a first end 134 of the second vertical member 122 opposite the first vertical member 122 thereby defining a channel 130 (shown in FIG. 10) between the first vertical member 122 and second vertical member 124. In some embodiments, the channel 130 has a width of about 0.815 inches. In other embodiments, the channel may have a width greater than or less than 0.815 inches.

In at least one embodiment, a height H1 (shown in FIG. 7) of the first vertical member 122 is less than a height H2 (shown in FIG. 11) of the second vertical member 124. In some embodiments, the height H1 may be about 4 inches and the height H2 may be about 5 inches. In other embodiments, the height H1 may be greater than or less than 4 inches and the height H2 may be greater than or less than 5 inches. In still other embodiments, the height H1 may be between about 3 inches and about 5 inches and the height H2 may be between about 4 inches and about 6 inches. Such difference in the height may aid in installation of, for example, mobile home skirting panels. More specifically, because the first vertical member 122 is shorter than the second vertical member 124, a mobile home skirting panel can be easily inserted over the first vertical member 122 and pivoted into the channel 130. In addition, the dimension of the height (H1) of the first vertical member 122 may be substantially similar to the horizontal members of a mobile home skirting 150, 152 (shown in FIG. 9) to provide a more uniform appearance of the skirting in general.

Figure 8:
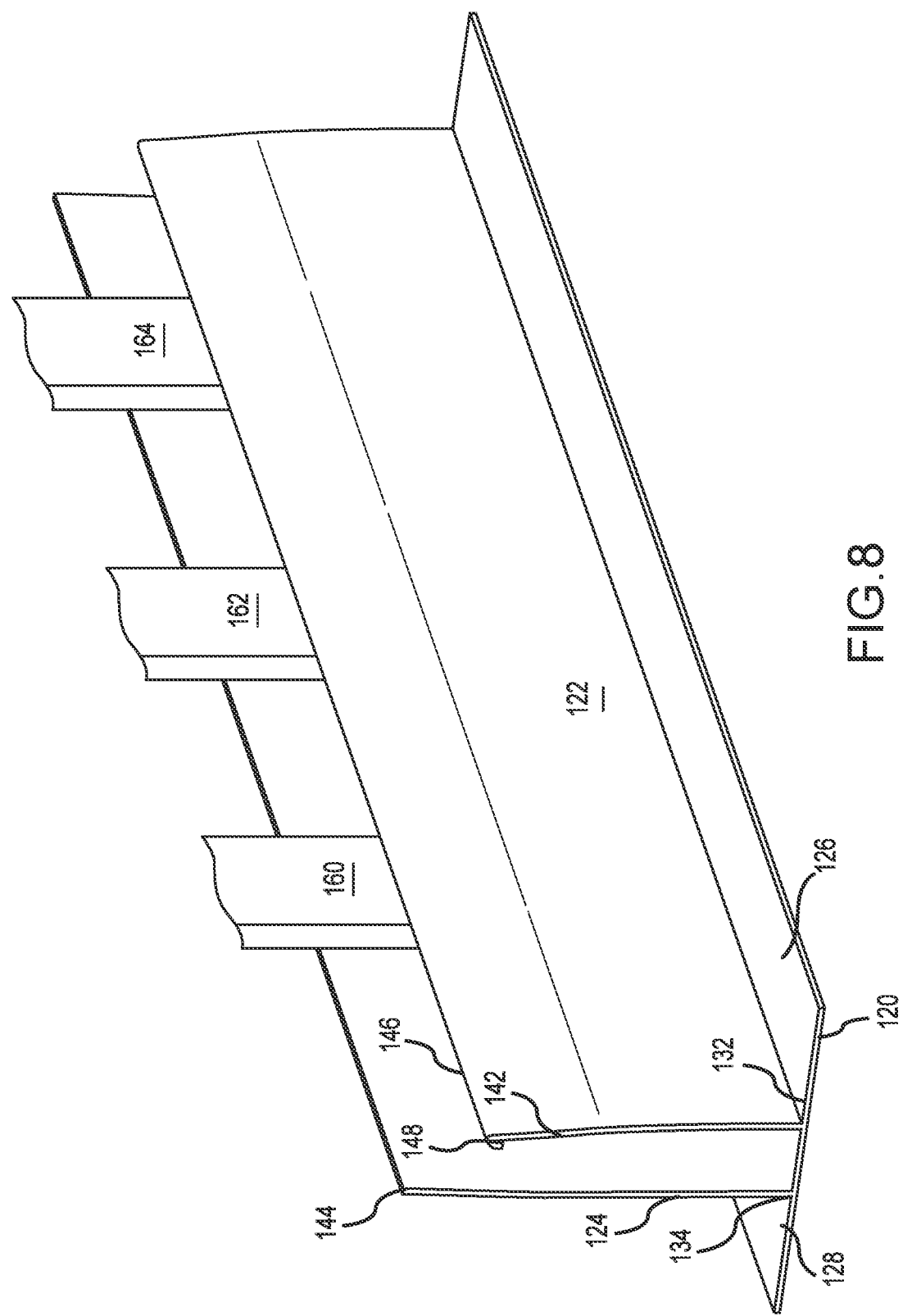
FIG. 8 is a perspective view of the mobile home skirting base including vertical supports according to aspects of the present invention.
Figure 9:
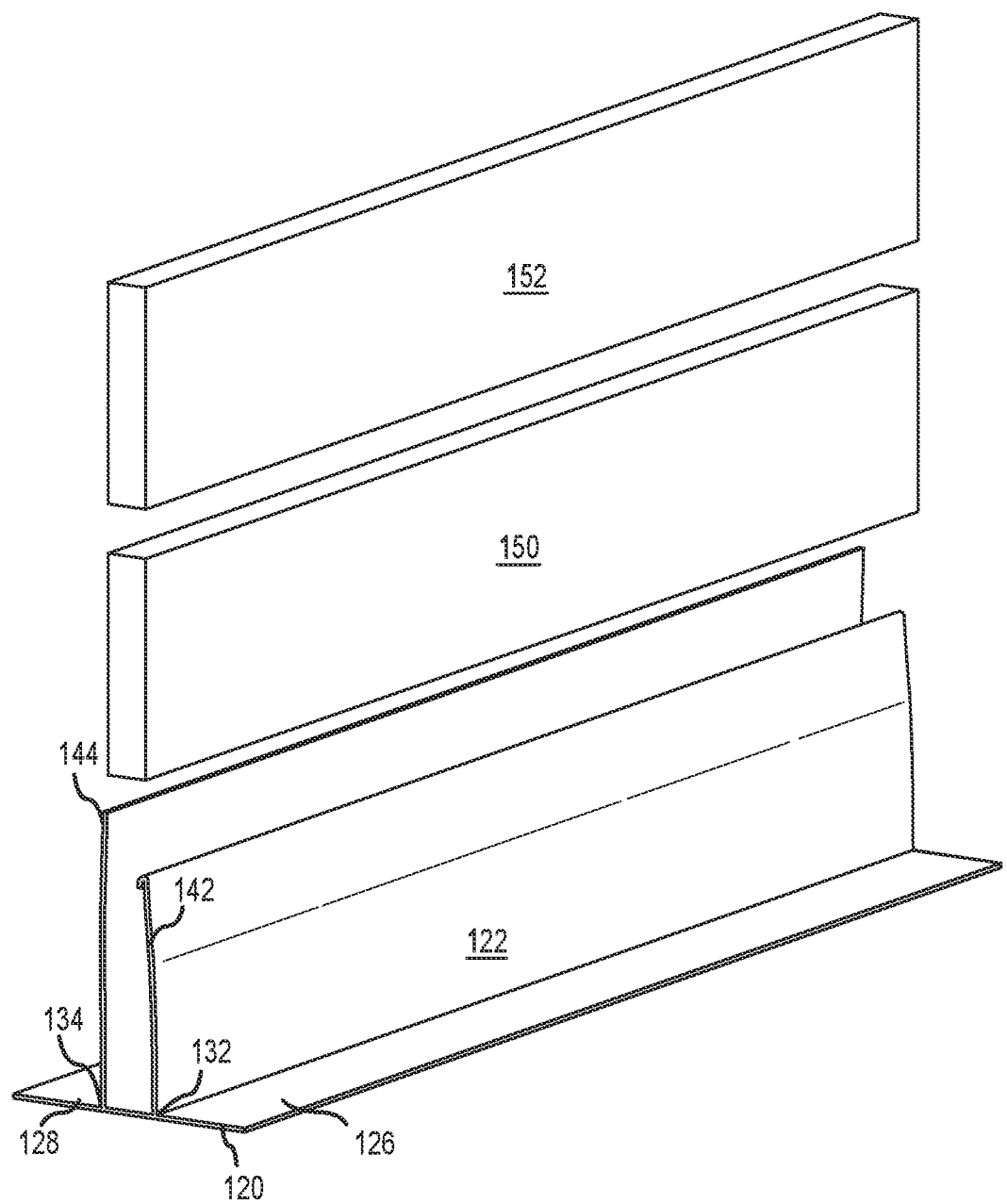
FIG. 9 Is a perspective view of the mobile home skirting base including horizontal members according to aspects of the present invention.
Figure 10:
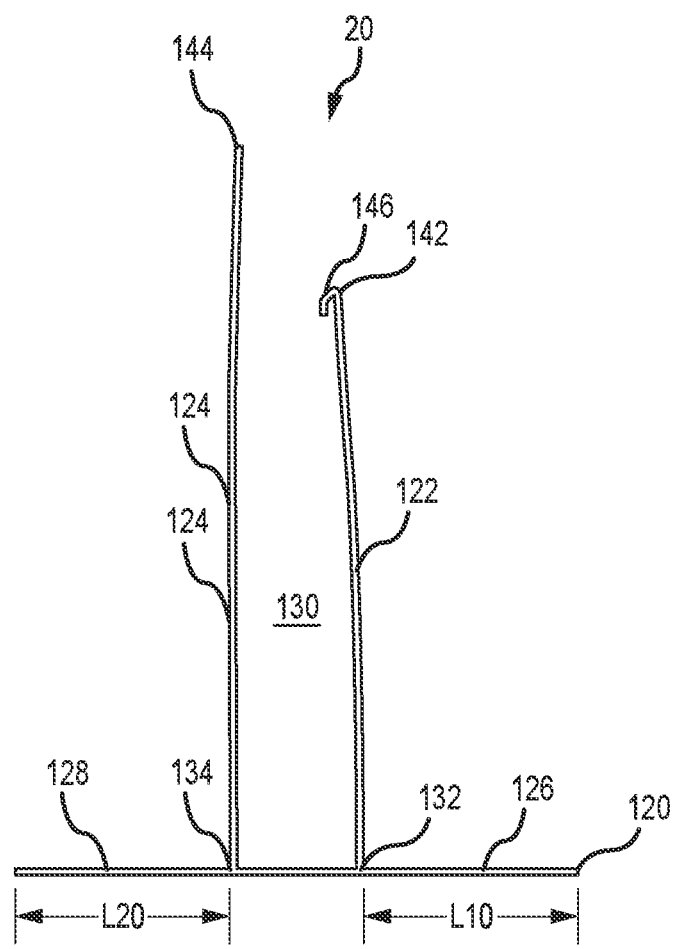
FIG. 10 is a cross-cut view of the mobile home skirting base according to aspects of the present invention.
Figure 11:
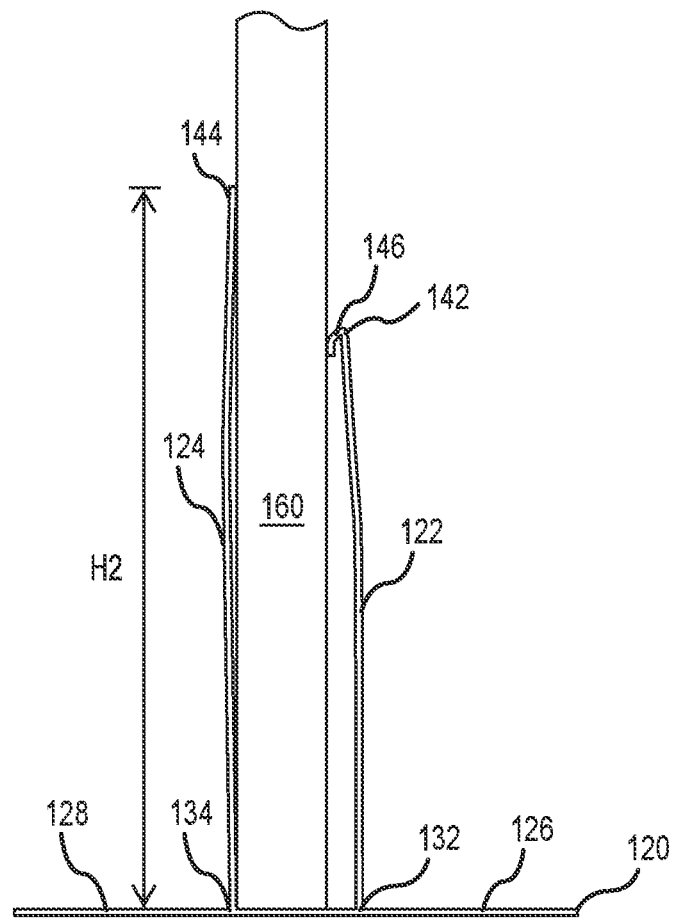
FIG. 11 is a cross-cut view of the mobile home skirting base including a vertical support according to aspects of the present invention.
Figure 12A:
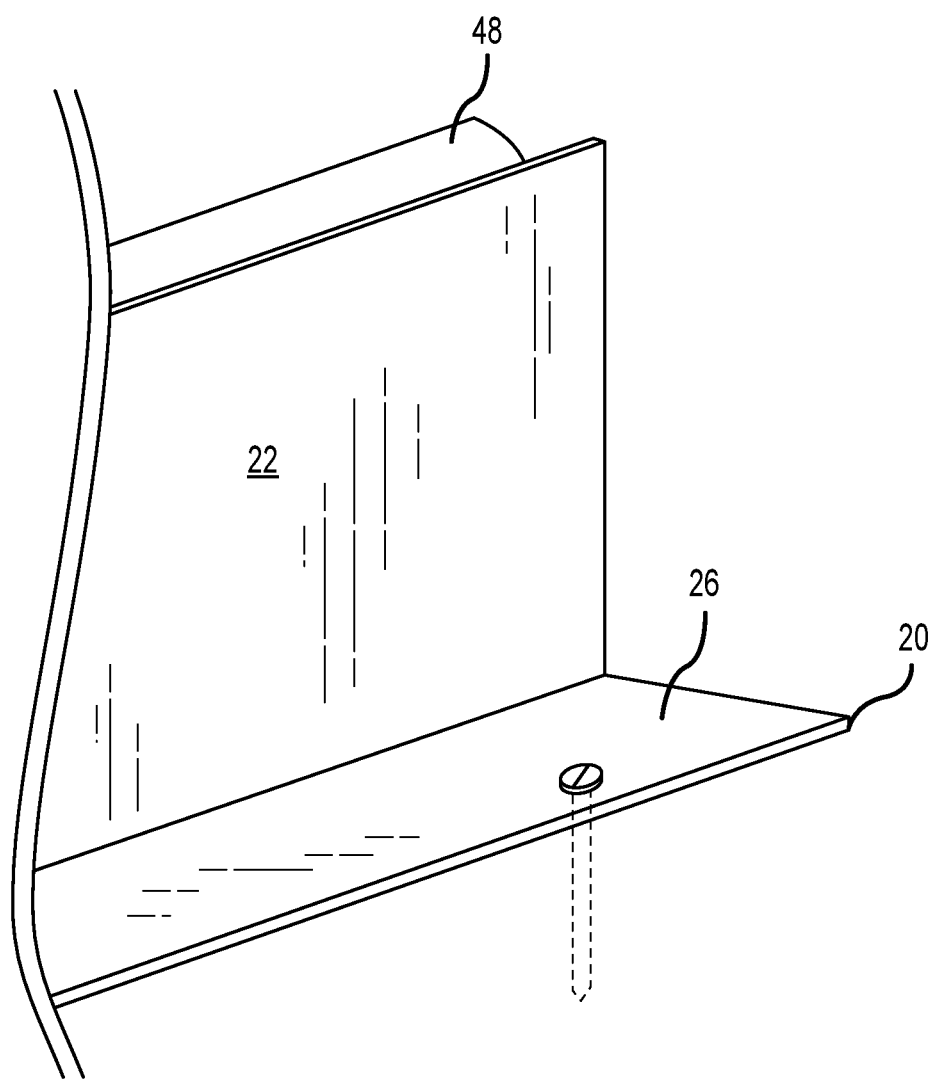
FIG. 12a is a truncated perspective view of the mobile home skirting base according to aspects of the present invention illustrating a nail as a mechanical attachment.
Figure 12B:
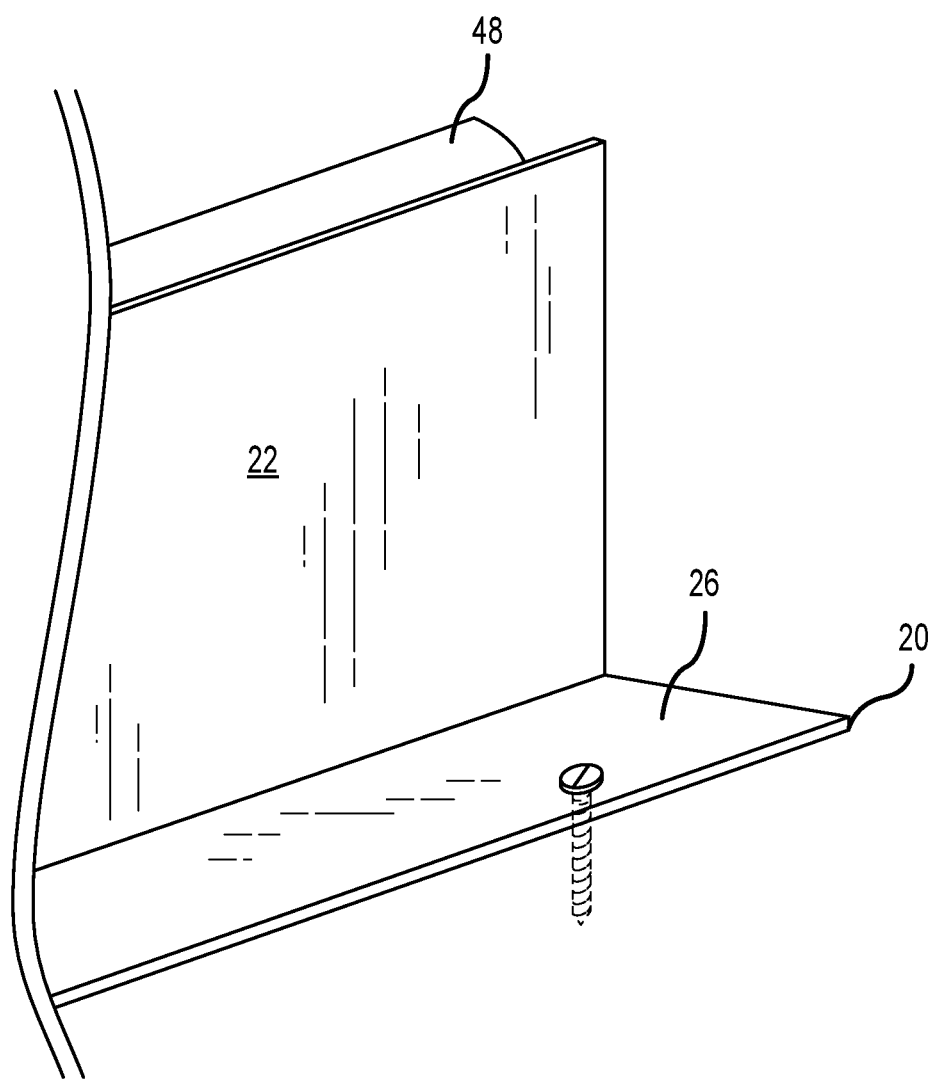
FIG. 12b is a truncated perspective view of the mobile home skirting base according to aspects of the present invention illustrating a screw as a mechanical attachment.
Figure 12C:
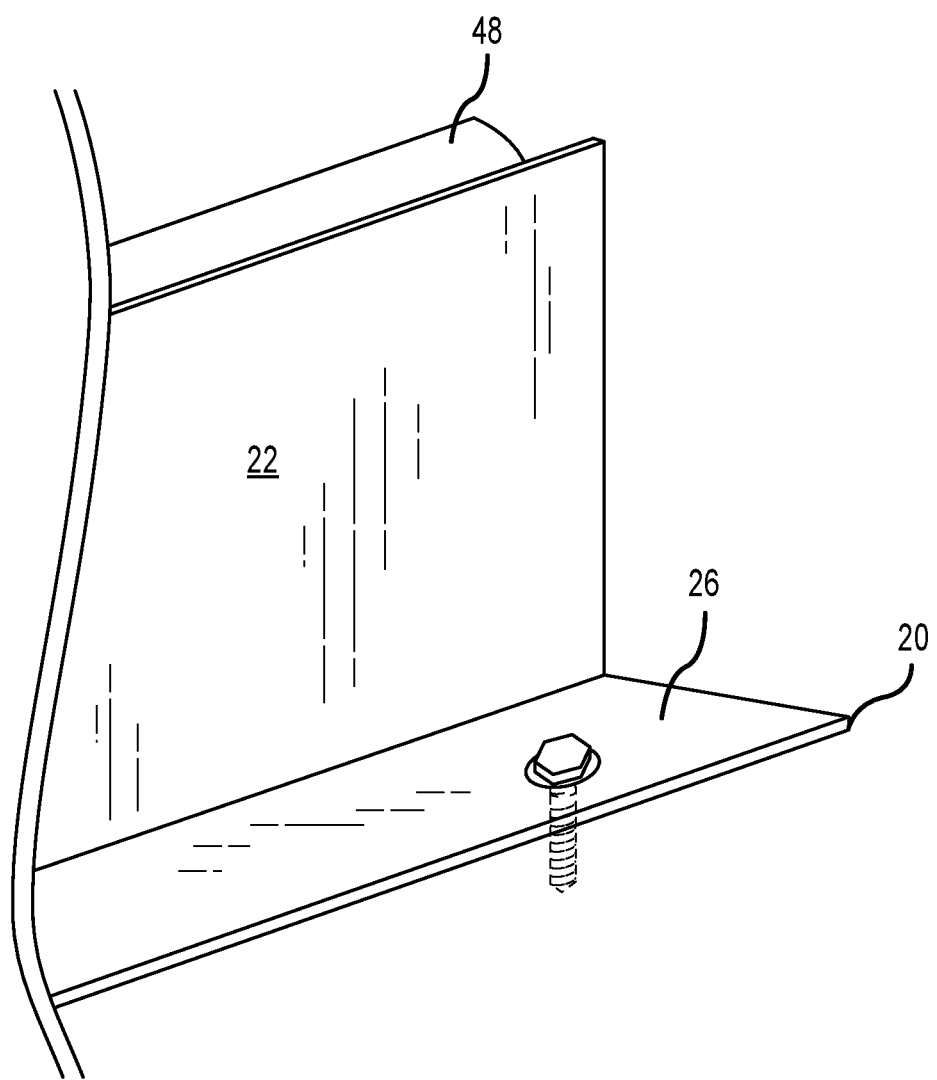
FIG. 12c is a truncated perspective view of the mobile home skirting base according to aspects of the present invention illustrating a bolt as a mechanical attachment.
Figure 12D:
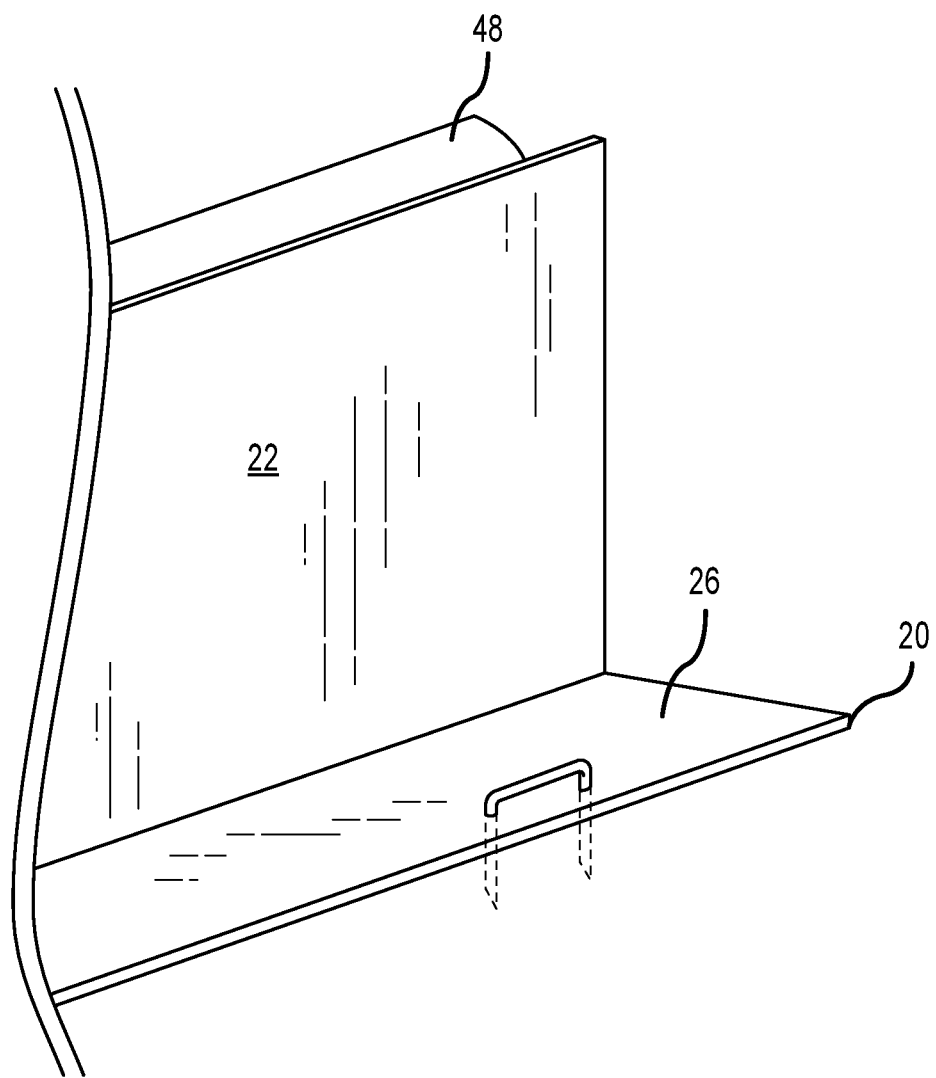
FIG. 12d is a truncated perspective view of the mobile home skirting base according to aspects of the present invention illustrating a staple as a mechanical attachment.
Figure 12E:
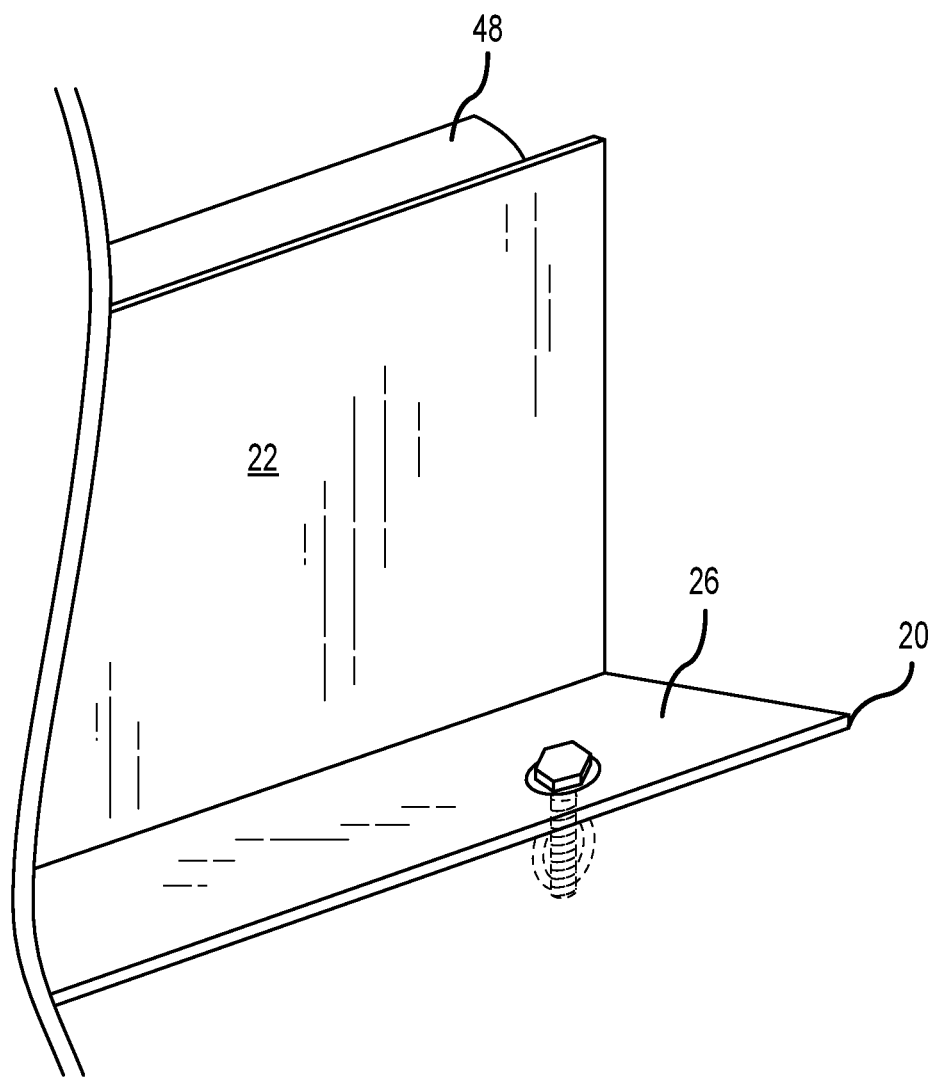
FIG. 12e is a truncated perspective view of the mobile home skirting base according to aspects of the present invention illustrating an anchor as a mechanical attachment.

On a second end 142 of the first vertical member 122, a hook-shaped retention edge 146 is inwardly oriented toward the channel 130 at an acute angle to provide a substantially rigid friction surface to retain, for example, vertical skirting supports and panels 160, 162, 164 (shown in FIG. 8). It will be appreciated that in some embodiments, the second end 142 of the first vertical member 122 may not include a hook-shaped retention edge 146. In still other embodiments, the second end 142 of the first vertical member 122 may be any shape.

The second vertical member 124 is substantially planar from the horizontal surface 120 to a second end 144 of the second vertical member 124. The second end 144 may be biased towards the channel 130, thereby providing a biasing force to support, for example, vertical skirting supports and panels 160, 162, 164. The second vertical member 124 may also provide a substantially rigid surface to provide support to, for example, vertical skirting supports and panels 160, 162, 164. For example, the second vertical member 124 may provide a backing and/or support for the vertical skirting supports and panels 160, 162, 164 against wind damage. It will be appreciated that in some embodiments, the second end 144 of the second vertical member 124 may include a hook-shaped retention edge. In still other embodiments, the second end 144 of the second vertical member 124 may be any shape.

The first vertical member 122 and the second vertical member 124 are biased towards each other (e.g., towards the channel 130) such that they provide a pinching force to secure vertical skirting supports 160, 162, 164 through direct physical pressure and friction rather than by mechanical means, such as for example, a screw. Although, mechanical means may be utilized to provide additional structural integrity. Thus, the skirting base 20 provides strong support, stabilization, and protection of the vertical skirting supports 160, 162, 164 because the first vertical member 122 and the second vertical member 124 provide a biasing force towards the channel 130, thereby providing a pinching force on the vertical skirting supports 160, 162, 164 when the vertical skirting supports 160, 162, 164 are positioned in the channel 130.

The horizontal surface 120 of the skirt base 20 can comprise a first lip 126 adjacent the first vertical member 122 and a second lip 128 adjacent the second vertical member 124, each extending outward from the channel to provide sufficient material to enhance the stability of the skirt base 20 or to allow for physical connection of the to a substrate. The length (L10) of the first lip 126 and the length (L20) of the second lip 128, can vary depending on the particular need or application.

As contemplated herein, the length (L10) of the first lip 126 and the length (L20) of the second lip 128 are no less than 20% of the height H1 or H2 of at least one the vertical members 122, 124. This results in base 20 having a first lip 126 and a second lip 128 approximately 3 or 4 times larger than existing solutions, The result is additional stability due to the increased contact with the substrate.

An additional benefit from the increase in the size of the first lip 126 and a second lip 128, is that the longer lip surfaces assist in preventing vegetation, such as grass, weeds, or plants from growing immediately adjacent the vertical surface of the skirting assembly and allows lawn maintenance implements, such as lawn mowers, edgers, weed eaters, and the like to be used near the skirting assembly without having to be too close to the skirting assembly and possibly causing accidental damage.

The increased and substantially similar height of the vertical members 122, 124 of the skirting base 20 not only provide a better bite by way of the inward facing retention edges, but allow for maintenance in and around the skirting, such as, for example, weed-eating and other landscaping activities that may otherwise cause displacement of a vertical skirting support upon contact due to lowered or asymmetrical vertical member heights.

In alternate embodiments, the mobile home skirting base can be alternatively configured for differing needs. By way of example, the length (L10) of the first lip 126 and the length (L20) of the second lip 128 can be identical or the length (L10) of the first lip 126 can be greater than the length (L20) of the second lip 128.

In additional embodiments, the skirting base 20 and skirting assembly can be configured to operate as an aesthetic repair for previously installed and damaged skirting.

As shown in FIGS. 12a-12e, the skirting base 10, 20 can be affixed to a substrate by mechanical means such as nails, rivets, screws, bolts, anchors and the like. The skirting base 10 can also be affixed to a substrate by chemical means such as glue, cement, adhesive, epoxy or any combination thereof. The skirting base 10, 20 can be used as a support on both the bottom of a skirting assembly (not shown) and at the top of a skirting assembly (not shown).

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

A number of variations and modifications of the foregoing disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed:

1. A mobile home skirting system comprising:
    a horizontal surface;
    a first vertical member affixed to the horizontal surface along a first edge of the first vertical member, wherein the height of the first vertical member is from about 3 inches to about 5 inches;
    a second vertical member affixed to the horizontal surface along a first edge of the second vertical member opposite the first vertical member thereby defining a channel between the first and second vertical members, wherein the height of the second vertical member is from about 4 inches to about 6 inches, wherein the horizontal surface extends outward from both sides of the channel to provide sufficient material for connection to a substrate and wherein the horizontal surface, the first vertical member and the second vertical member define a base; and
    an inwardly oriented hook-shaped retention edge forming an acute angle toward the channel on a second edge of the first vertical member, wherein a height of the first vertical member is less than a height of the second vertical member and wherein the hooked shaped retention edge and the second vertical member are biased towards the channel and configured to secure a vertical skirting panel through direct physical pressure exerted by the first and second vertical members.

2. The mobile home skirting system of claim 1, wherein the system comprises extruded material.

3. The mobile home skirting system of claim 2, wherein the base is a single extruded polymer.

4. The mobile home skirting system of claim 1, wherein the system is attached to a substrate by one of mechanical attachment or chemical attachment.

5. The mobile home skirting system of claim 4, wherein the system is attached to a substrate by mechanical attachment selected from the group consisting of: nails; screws; bolts; staples; and anchors.

6. The mobile home skirting system of claim 4, wherein the system is attached to a substrate by chemical attachment selected from the group consisting of: glue, cement, and epoxy.

7. The mobile home skirting system of claim 1, wherein the base supports both a bottom and a top of the skirting system.

8. A mobile home skirting system comprising:
a horizontal surface;
a first vertical member affixed to the horizontal surface along a first edge of the first vertical member, wherein the height of the first vertical member is from about 3 inches to about 5 inches;
a second vertical member affixed to the horizontal surface along a first edge of the second vertical member opposite the first vertical member thereby defining a channel between the first and second vertical members, wherein the height of the second vertical member is from about 4 inches to about 6 inches, wherein the horizontal surface extends outward from both sides of the channel to provide sufficient material for connection to a substrate and wherein the horizontal surface, the first vertical member and the second vertical member define a base; and
a hook-shaped retention edge on a second edge of the first vertical member inwardly oriented toward the channel forming an acute angle toward the channel, wherein a height of the first vertical member is less than a height of the second vertical member and wherein the hooked shaped retention edge and the second vertical member are biased towards the channel and configured to secure a vertical skirting panel through direct physical pressure exerted by the first and second vertical members, wherein the mobile home skirting base comprises a single extruded polymer.

9. The mobile home skirting system of claim 8, wherein the system is attached to a substrate by one of mechanical attachment or chemical attachment.

10. The mobile home skirting system of claim 9, wherein the system is attached to a substrate by mechanical attachment selected from the group consisting of: nails; screws; bolts; staples; and anchors.

11. The mobile home skirting system of claim 9, wherein the system is attached to a substrate by chemical attachment selected from the group consisting of: glue, cement, and epoxy.

12. The mobile home skirting system of claim 8, wherein the base supports both a bottom and a top of the skirting system.

13. A mobile home skirting system, comprising:
a base comprising a horizontal surface adapted to be attached to a substrate, the base including a first vertical member having from about 3 inches to about 5 inches and a second vertical member having from about 4 inches to about 6 inches, wherein a channel is defined between the first vertical member and second vertical member, a height of the first vertical member is less than a height of the second vertical member, the first vertical member having an inwardly oriented hook-shaped retention edge forming an acute angle toward the channel and the second vertical member being biased toward the channel, thereby the first vertical member and the second vertical member form a biasing force towards the channel to retain a vertical skirting panel, wherein the height of the first vertical member is substantially similar to horizontal members of the mobile home skirting system, wherein the first and second vertical members are adapted to secure a vertical skirting panel through direct physical pressure exerted by the first and second vertical members, and wherein a mobile home rests on the substrate.

14. The mobile home skirting system of claim 13, wherein the horizontal surface of the base comprises a first lip adjacent the first vertical member and a second lip adjacent the second vertical member, each extending outward from the channel.

15. The mobile home skirting system of claim 14, wherein a length of the first lip and a length of the second lip are no less than 20% of the height of at least one of the first vertical member or the second vertical member.

* * * * *